United States Patent [19]

Nishimura

[11] Patent Number: 5,001,780
[45] Date of Patent: Mar. 19, 1991

[54] OPTICAL COMMUNICATION ADAPTER WITH PROJECTOR

[75] Inventor: Kosuke Nishimura, Yamatokoriyama, Japan

[73] Assignee: Sharp Kabushiki Kaisha, Osaka, Japan

[21] Appl. No.: 921,843

[22] Filed: Oct. 24, 1986

Related U.S. Application Data

[63] Continuation of Ser. No. 623,723, Jun. 22, 1984, abandoned.

[30] Foreign Application Priority Data

Jun. 24, 1983 [JP] Japan .................................. 58-114892

[51] Int. Cl.⁵ ............................................ H04B 10/10
[52] U.S. Cl. ........................................ 455/607; 370/4
[58] Field of Search ............... 455/601, 606, 607, 617; 370/89, 94, 4, 92

[56] References Cited

U.S. PATENT DOCUMENTS

| | | | |
|---|---|---|---|
| 4,229,829 | 10/1980 | Grunwald | 455/617 |
| 4,236,245 | 11/1980 | Freeny et al. | 370/94 |
| 4,358,858 | 11/1982 | Tamura et al. | 455/607 |
| 4,402,090 | 8/1983 | Gfeller et al. | 455/601 |
| 4,499,608 | 2/1985 | Broockman et al. | 455/607 |
| 4,809,257 | 2/1989 | Gantenbein | 370/4 |

FOREIGN PATENT DOCUMENTS

| | | | |
|---|---|---|---|
| 2431937 | 1/1976 | Fed. Rep. of Germany | 455/613 |
| 2823931 | 12/1979 | Fed. Rep. of Germany | 455/606 |
| 58-103242 | 6/1983 | Japan | 455/617 |
| 58-125923 | 7/1983 | Japan | 455/601 |

OTHER PUBLICATIONS

Gfeller et al.—"Wireless in House"—Processing of the IEEE, vol. 67, No. 11, Nov. 1979 pp. 1474-1486.

Primary Examiner—Joseph A. Orsino
Assistant Examiner—L. Van Beek

[57] ABSTRACT

An optical communication system includes a single master machine, a plurality of slave machines, and an optical adapter for optically communicating between the master machine and the slave machines. The optical adapter comprises a receiving unit, an amplifier, and an optical projector consisting of a concave mirror. The receiving unit receives optical information from either the master machine or the slave machines. The amplifier means amplifies the optical information. The concave mirror reflects or propagates the optical information of the master machine or the slave machines toward the slave machines or the master machine, respectively.

8 Claims, 3 Drawing Sheets

OPTICAL COMMUNICATION ADAPTER WITH PROJECTOR

This application is a continuation of application Ser. No. 623,723 filed on June 22, 1984 and now abandoned.

BACKGROUND OF THE INVENTION

The present invention relates to an optical communication apparatus and, more particularly, to an optical communication adapter with a projector.

The conventional optical communication apparatus for transmitting and receiving data or programs with optical communication is presented with a personal computer, a hand-held computer, a pocket computer or the like. To make optical communication between a single master machine and a plurality of slave machines, the master machine must provide a large optical output and each of the slave machines can be provided with an input amplifier for receiving and amplifying a fine input. This results in relatively great power consumption in the machines, large machine size, and high cost of the machines.

SUMMARY OF THE INVENTION

Accordingly, it is an object of the present invention to provide an improved optical communication adapter suitable for optical communication between a single master machine and a plurality of slave machines.

It is another object of the present invention to provide an improved optical communication projector suitable for optical communication between a single master machine and a plurality of slave machines.

It is a further object of the present invention to provide an improved optical communication adapter with an optical projector suitable for optical communication between a single master machine and a plurality of slave machines.

Other objects and further scope of applicability of the present invention will become apparent from the detailed description given hereinafter. It should be understood, however, that the detailed description of and specific examples, while indicating preferred embodiments of the invention, are given by way of illustration only, since various changes and modifications within the spirit and scope of the invention will become apparent to those skilled in the art from this detailed description.

According to a preferred embodiment of the present invention, an optical communication system includes a single master machine, a plurality of slave machines, and an optical adapter provided for optically communicating between the master machine and the slave machines. The optical adapter comprises a receiving unit, an amplifier, and an optical projector consisting of a concave mirror. The receiving unit receives optical information of either the master machine or the slave machines. The amplifier amplifies the optical information. The concave mirror reflects or propagates the optical information of the master machine or the slave machines toward the slave machines or the master machine, respectively.

BRIEF DESCRIPTION OF THE DRAWINGS

The present invention will be better understood from the detailed description given hereinbelow and the accompanying drawings which are given by way of illustration only, and thus are not limitative of the present invention and wherein.

DETAILED DESCRIPTION OF THE INVENTION

First of all, the gist of the present invention can be applied to any machine inasmuch as the machine utilizes some optical communication. Such a machine may be a personal computer, a hand-held computer, a pocket computer, or the like.

Figure 1:
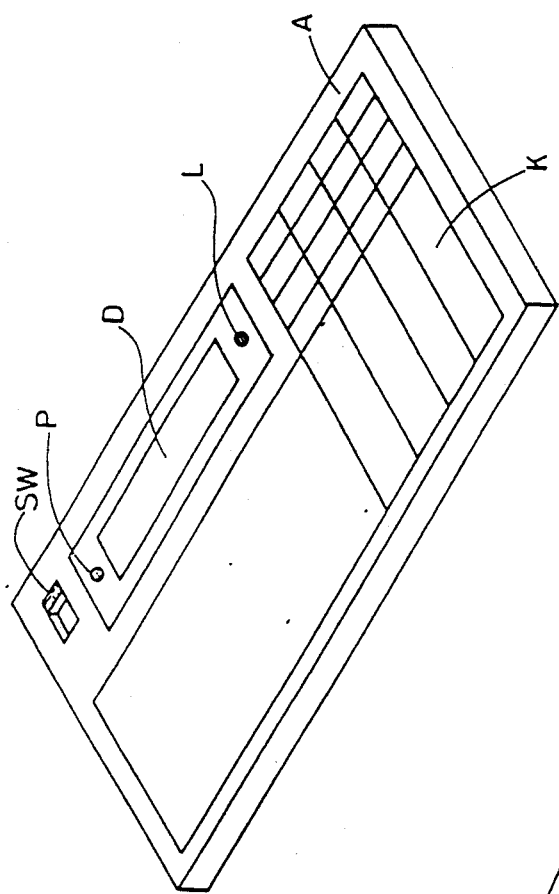
FIG. 1 is a perspective view of an optical communication machine such as a pocket computer according to the present invention.

FIG. 1 is a perspective view of a pocket computer according to a preferred embodiment of the present invention.

The pocket computer comprises a keyboard K, a display D, a power switch SW, a light emitting unit L for emitting an item of optical information, and a light receiving unit P for receiving another item of optical information. The keyboard K comprises a data transmission key actuated to start the optical communication, digit keys actuated for selecting a specific digit number to whose number of slave machine the optical information is directed.

Figure 2:
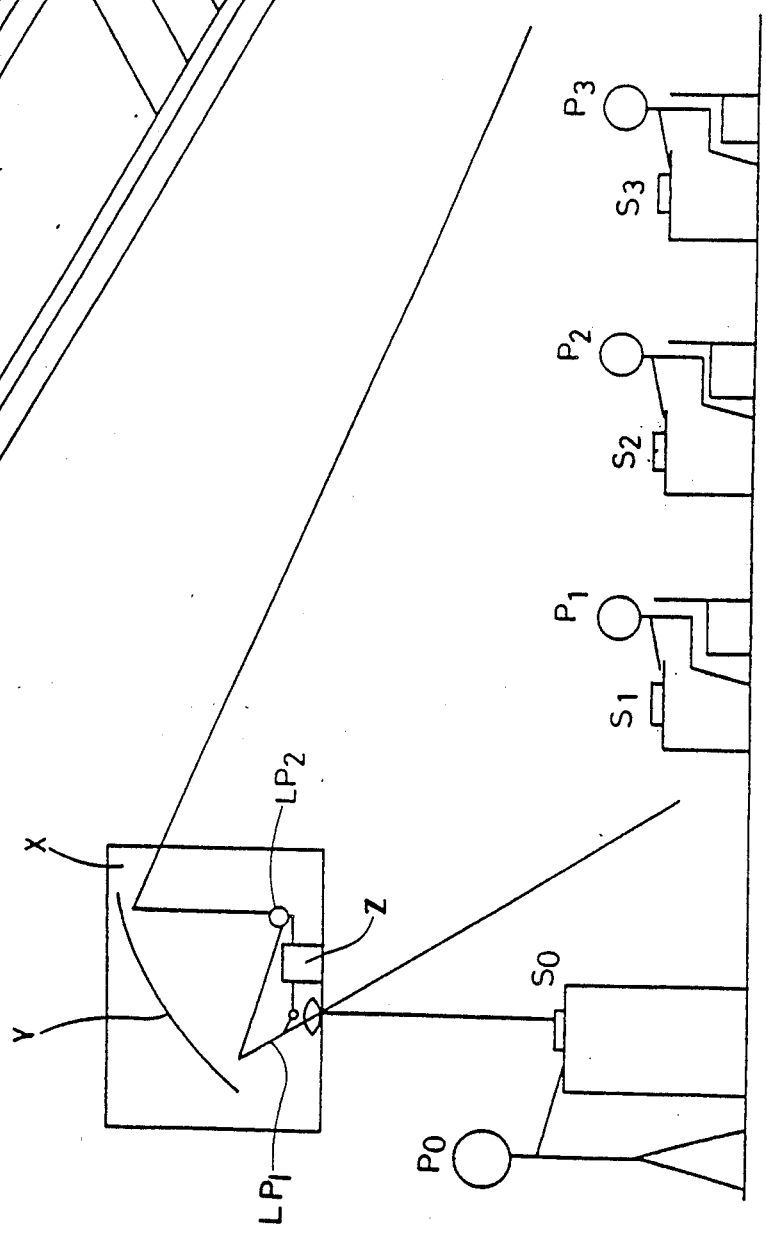
FIG. 2 is a schematic view of an optical communication system comprising a single master machine, a plurality of slave machines, and an optical adapter with a projector according to the present invention.

FIG. 2 is a schematic view of an optical communication system of the present invention including a single master machine S0, a plurality of slave machines S1–S3, and an optical adapter X. The optical adapter X is provided for optically communicating between the master machine S0 and the slave machines S1–S3. The master machine S0 and each of the slave machines S1–S3 are compatible and alternative.

In FIG. 2, it is assumed that a single teacher P0 with the master machine S0 optically communicates with a plurality of pupils P1–P3, respectively, with the slave machines S1–S3.

Referring to FIG. 2, according to the present invention, the optical adapter X is positioned above the master machine S0. The optical adapter X comprises a first transmitting/receiving unit LP1, an amplifier Z, a second transmitting/receiving unit LP2, and an optical projector consisting of a concave mirror Y. The first transmitting/receiving unit LP1 receives first optical information of the master machine S0 to convert the optical information to electrical signals. The converted signals representative of the first optical information are amplified with the amplifier Z to thereby transfer the amplified signals toward the transmitting/receiving unit LP2. The transmitting/receiving unit LP2 is responsive to the amplified electrical signals for converting the electrical signals into second optical information. The second optical information is directed to the concave mirror Y, so that the concave mirror Y widely reflects or propagates the second optical information toward the slave machines S1–S3. The slave machines S1–S3 receives the second optical information.

Alternatively, each of the slave machines S1–S3 emits first optical information toward the concave mirror Y. The concave mirror Y converges the first optical information on the transmitting/receiving unit LP2. The transmitting/receiving unit LP2 converts the first optical information to the electrical signals. The amplifier Z is operated to amplify the electrical signals representative of the first optical information. The transmitting-/receiving unit LP1 is responsive to the electrical signals from the amplifier Z for converting the signals into the second optical information, so that the master machine S0 can receive the second optical information.

Figure 3:
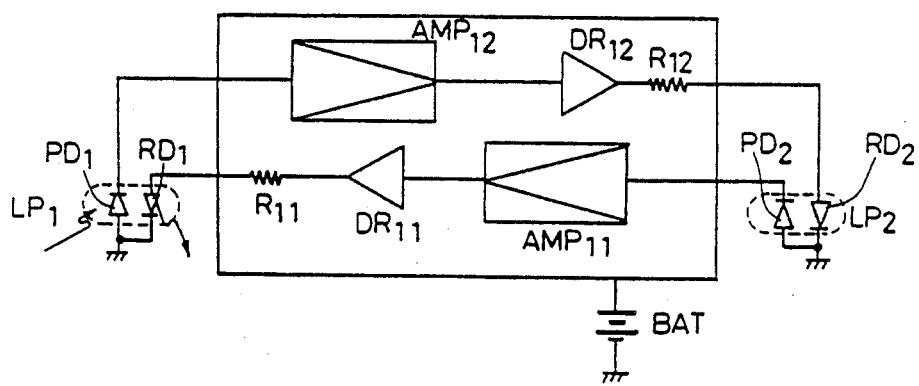
FIG. 3 is a block diagram of the optical adapter.

FIG. 3 is a block diagram of the first and second transmitting/receiving units LP1 and LP2, and amplifier Z in the optical adapter X.

The first transmitting/receiving units LP1 and LP2 comprise photodiodes PD1 and PD2 for receiving elements, and light emitting diodes RD1 and RD2 for light emitting elements, respectively. The photodiodes PD1 and PD2 convert the optical information into the electrical signals, and the light emitting diodes RD1 and RD2 conducts its opposing control.

To amplify the optical information as received with the first transmitting/receiving unit LP1, the amplifier Z comprises a first amplifier circuit AMP12, a driver DR12, and a first resistance R12. The amplifier circuit AMP12 is provided for amplifying the optical information. The driver DR12 is responsive to the amplified information for power amplifying it. The first resistance R12 is provided for limiting a current of the amplified information, so that the second transmitting/receiving unit LP2 receives the current.

On the other hand, to amplify the optical information as received with the second transmitting/receiving unit LP2, the amplifier Z comprises a second amplifier circuit AMP11, a second driver DR11, a second resistance R11. Each of these circuit elements functions as the same operation as the above-described circuit elements. A battery BAT is provided for powering the circuit elements.

Figure 4:
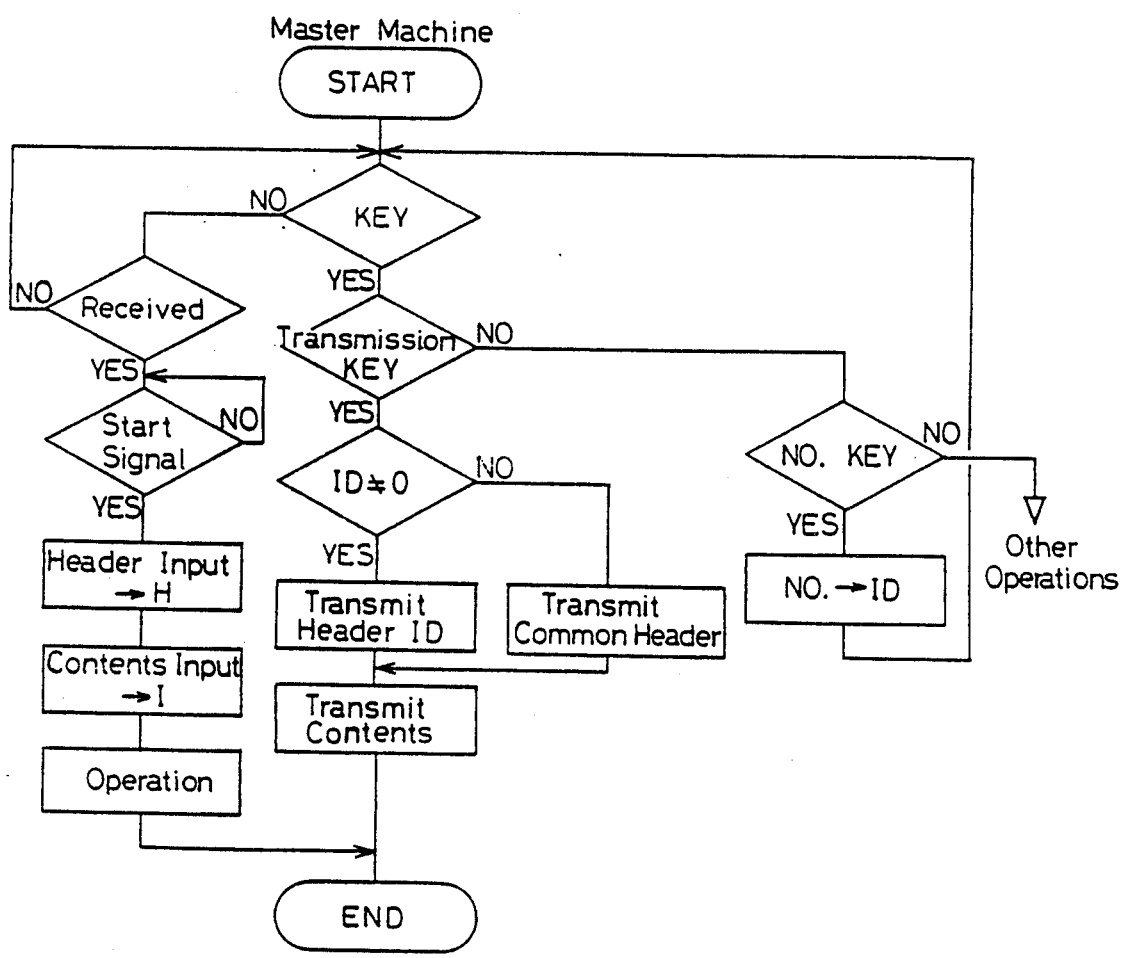
FIGS. 4 and 5 are flow charts of the operations of the master machine and the plurality of slave machines, respectively.
Figure 5:
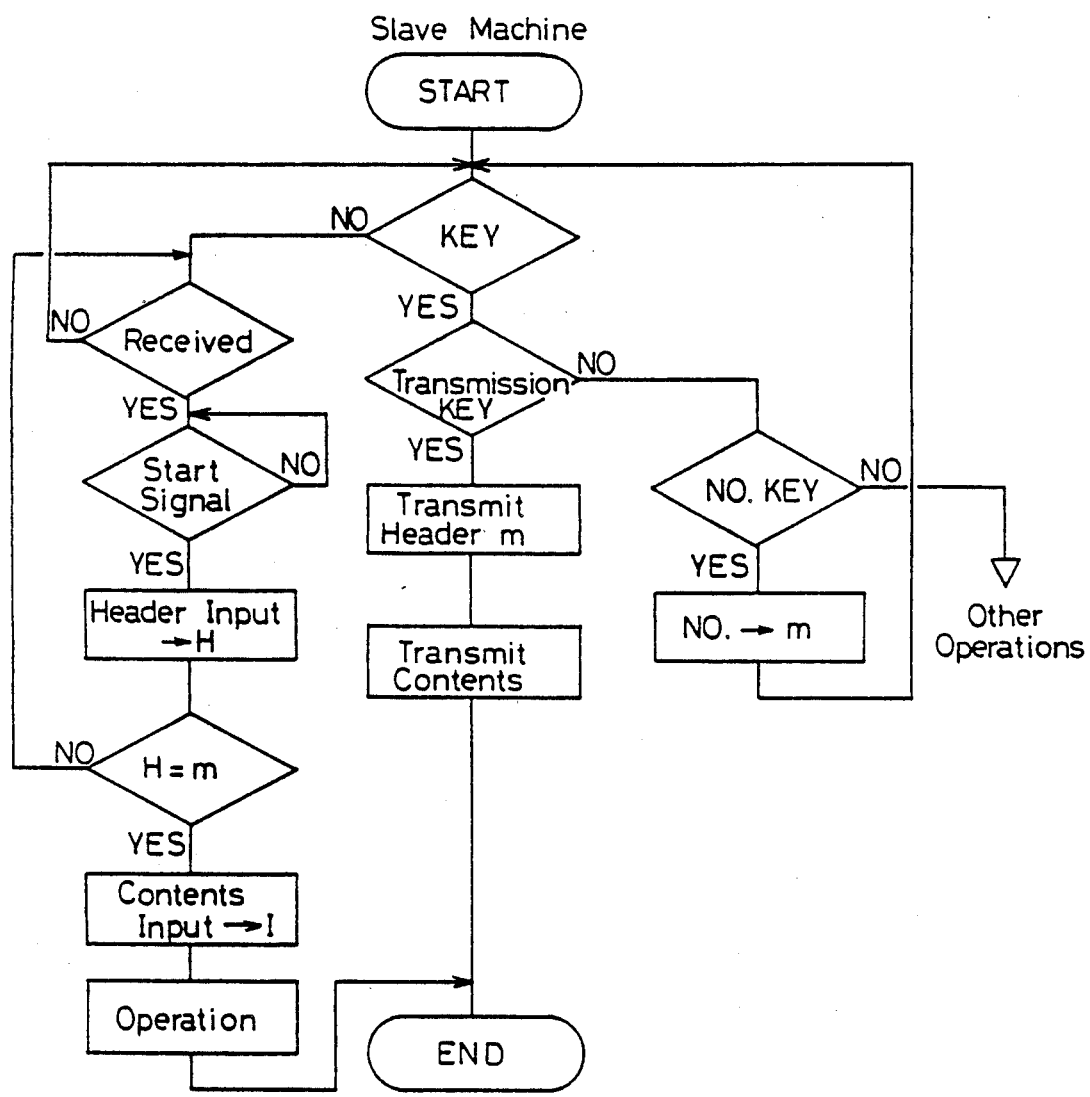

FIGS. 4 and 5 are flow charts of the operation of each of the master machine S0 and the slave machines S1-S3, respectively.

To optically communicate between the machines, preferably, the transmitted data are of the type including a header having data codes. The codes can represent whether all the slave machines S1-S3 can communicate with the master machine S0 on the one hand, in which the teacher P0 outputs the optical data toward all the pupils P1-P3, or whether one or more selected machines among the slave machines S1-S3 can communicate with the master machine S0, on the other hand, in which the teacher P0 can provide the optical information to the one or more selected pupils. For this purpose, in such a case, each of the slave machines S1-S3 should memorize its own identification code. Therefore, before each of the slave machines S1-S3 can receive the optical information from the master machine S0, it can detect whether the following information is directed to itself or not, based on the data code in the header.

Referring to FIG. 4, the following steps are conducted in the master machine S0:

It is detected whether some key input is present. If some key input is present and the inputted key is a digit key, the corresponding digit number is inputted into a register ID. When the transmission key in the keyboard K is operated to instruct to start the optical data communication, the value of the register ID is detected. When ID≠0, the contents of the register ID are transmitted as the header and, subsequently, the optical information is transmitted. In parallel with the key detection, the presence or the absence of any received information is detected. If some optical information is forwarded from some slave machine to the master machine, the generation of a start signal indicating that the data reception should now be conducted is awaited. If it is generated, the header inputs are inputted into a header register H and the contents of the optical information are inputted into an input register I, so as to received optical information. In accordance with the optical information received, some operation is now conducted.

It may be possible that the header to be transmitted by the master machine SO can, have an identification code for selecting some slave machines to receive a transmission, each identification code number of the slave machines being equal to or smaller than the transmitted identification code number. To select a single slave machine to receive the optical information, it may be possible to add an additional identification code to specify it.

Referring to FIG. 5, each of the slave machines S1-S3 conducts the following steps:

The presence of some key input is detected. If it is detected whether some digit key is actuated, the corresponding digit number which is used as an identification code of this slave machine is inputted into an identification register m. When the transmission key of the keyboard K is operated, the value of the register m is transmitted as the header and, thereafter, the data are forwarded, subsequently. If the master machine SO transmits some optical information to this slave machine, the generation of the start signal indicating that the optical information from the master machine SO should now be received is awaited. Responsive to the generation of the start signal, the header having some identification code is received by this slave machine and inputted into the register H. The values of the registers H and m are compared. If they agree to each other, the optical information following the header is received and inputted into the register I. Depending upon the contents of the optical information received, the data processing is carried out. If H≠m, no data can be received.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A method of communication between a teacher having a master machine and a plurality of pupils having slave machines comprising:

developing a first optical information signal by said master machine;

receiving in an optical adapter positioned above said master machine, said first optical information signal and converting said first optical information signal into a first electrical signal representative thereof;

amplifying said first electrical signal;

converting said amplified first electrical signal into a second optical information signal;

reflecting said second optical information signal from a concave mirror located above said master machine to spread said second optical information signal throughout an area occupied by said pupils;

each said slave machine having its own identification code;

selecting at least one of said slave machines by preceding said optical information signals by a header having a data code specifying the at least one of said slave machines the identification code of each slave machine being the same or smaller than the data code of the header; and receiving said second optical information signal within said at least one of the slave machines selected by said data code of said header.

2. The method according to claim 1, further comprising the step of specifying all of said slave machines by said data code of the header.

3. The method according to claim 1, further comprising the steps of:
developing a third optical information signal by a selected one of said slave machines;
reflecting said third optical information signal from said concave mirror;
receiving said third optical information signal and converting said third optical information signal into a second electrical signal;
amplifying said second electrical signal;
converting said amplified second electrical signal into a fourth optical information signal; and
receiving said fourth optical information signal within said master machine.

4. The method according to claim 1, further comprising the step of selecting said master and slave machines from a group including a personal computer, a hand held computer, and a pocket computer.

5. A system of communication between a teacher having a master machine and a plurality of pupils having slave machines comprising:
an optical transmitter/receiver provided in each of said master machine and said slave machines, said optical transmitter/receiver of said master machine transmitting a first optical information signal; and
an optical communication adaptor means for facilitating transmission between said master machine and at least one selected slave machine located throughout an area occupied by said pupils, said optical communication adaptor means bieng located above the optical transmitter/receiver of said master machine and including,
first light receiving means for receiving said first optical information signal and converting said first optical information signal into a first electrical signal representative thereof,
first amplifying means operatively connected to said first light receiving means for amplifying said first electrical signal,
first light emitting means responsive to the amplified first electrical signal for converting the amplified first electrical signal into a second optical information signal, and
reflector means arranged to receive said second optical information signal and for reflecting said second optical information signal to spread said second optical information signal throughout the area occupied by said pupils, said reflector means comprising a concave mirror;
each said slave machine having its own identification code;
said master machine further comprising means for developing a header provided immediately preceding said optical information signal, said header having a data code for specifying the selected at least one slave machine,
each said slave machine being further provided with means operatively connected to the optical transmitter/receiver for comparing an identification code thereof with said data code of said header, the identification code of each slave machine being the same or smaller than the data code of the header and enabling receipt of said second optical information signal when said identification code and said data code of said header agree with each other.

6. The system according to claim 5, wherein a selected one of said optical transmitter/receivers of said slave machines transmits a third optical information signal, said third optical information signal being reflected by said reflector means;
said optical communication adaptor means further including,
second light receiving means for receiving said third optical information signal reflected from said reflector means and converting said third optical information signal into a second electrical signal representative thereof,
second amplifying means operatively connected to said second light receiving means for amplifying said second electrical signal, and
second light emitting means responsive to said amplified second electrical signal for converting said amplified second electrical signal into a fourth optical information signal;
said optical transmitter/receiver of said master machine receiving said further optical information signal from said communication adaptor means.

7. The system according to claim 5, wherein said data code of said header specifies all of said slave machines.

8. The system according to claim 5, wherein said master and slave machines are selected from a group including a personal computer, a hand held computer, and a pocket computer.

* * * * *